United States Patent [19]

Borras

[11] Patent Number: 5,128,938
[45] Date of Patent: Jul. 7, 1992

[54] ENERGY SAVING PROTOCOL FOR A COMMUNICATION SYSTEM

[75] Inventor: Jaime A. Borras, Hialeah, Fla.

[73] Assignee: Motorola, Inc., Schaumburg, Ill.

[21] Appl. No.: 666,499

[22] Filed: Mar. 6, 1991

Related U.S. Application Data

[63] Continuation of Ser. No. 318,399, Mar. 3, 1989, abandoned.

[51] Int. Cl.⁵ .......................... H04B 1/16; G08B 5/22
[52] U.S. Cl. ............................. 370/95.1; 340/825.44; 455/343
[58] Field of Search ............... 370/13, 13.1, 85.7, 370/95.1, 95.2, 95.3; 340/825.04, 825.06, 825.16, 825.44, 311.1, 309.15; 455/9, 49, 53, 54, 56, 68, 70, 343; 364/143

[56] References Cited

U.S. PATENT DOCUMENTS

| | | | |
|---|---|---|---|
| 4,298,860 | 11/1981 | Norberg et al. | 340/825.16 |
| 4,427,980 | 1/1984 | Fennell et al. | 340/825.44 |
| 4,431,991 | 2/1984 | Bailey et al. | 340/825.44 |
| 4,449,248 | 5/1984 | Leslie et al. | 455/343 |
| 4,518,961 | 5/1985 | Davis et al. | 455/343 |
| 4,577,315 | 3/1986 | Otsuka | 455/70 |
| 4,736,461 | 4/1988 | Kawasaki et al. | 455/343 |
| 4,794,649 | 12/1988 | Fujiwara | 455/343 |
| 4,839,639 | 6/1989 | Sato et al. | 455/343 |
| 4,841,520 | 6/1989 | Steely | 370/13 |
| 4,860,005 | 8/1989 | DeLuca et al. | 340/825.44 |
| 4,903,319 | 2/1990 | Kasai et al. | 455/343 |

*Primary Examiner*—Douglas W. Olms
*Assistant Examiner*—Alpus H. Hsu
*Attorney, Agent, or Firm*—Pedro P. Hernandez; Thomas G. Berry

[57] ABSTRACT

A centralized communication system controller (102) measures and stores a historical record of each subscriber unit's communication activity. By examining this historical record, the controller predicts the subscriber unit's communication activity over a future time interval. A code based upon this prediction is transmitted to the subscriber unit (110), which causes the subscriber unit to enter an energy saving mode and deactivate (208) non-essential circuits for a time period represented by the code. In this way, the duration of the "sleep" interval may be optimally varied based upon the subscriber unit's communication history. In another aspect of the invention, unexpected messages for a subscriber unit in the energy saving mode are stored (114) electronically until the conclusion of the "sleep" interval. This message storing function enhances system efficiency when the subscriber unit's communication history does not correlate with actual commuication traffic.

15 Claims, 6 Drawing Sheets

ENERGY SAVING PROTOCOL FOR A COMMUNICATION SYSTEM

This is a continuation of application Ser. No. 07/318,399, filed Mar. 3, 1989, and now abandoned.

TECHNICAL FIELD

This invention relates generally to radio frequency (RF) communication systems, and more particulary to battery powered subscriber units operating within such systems, and is particularly directed toward an energy saving protocol for battery powered subscriber units operating within a trunked RF communication system.

BACKGROUND ART

Broadly stated, the goal of any energy saving system is to prolong the functional life of a device without degrading or disrupting the device's proper operation. To do this, the lifetime of the device's energy source (i.e., the battery) must be extended. Several energy saving techniques designed to accomplish battery life extension are known. The most widely known techniques involve the "Battery Savers" commonly used in the paging receiver arts. Typical of these battery saving techniques are methods to temporarily inactivate non-essential circuits during periods of non-activity. In more advanced battery savers, it is also known to reduce the operational speed (i.e., clock rate) of microprocessors and other digital circuits. In this way, the discharge rate of the battery is reduced thereby extending the pager's operational life.

However useful the paging battery saving techniques may be, they suffer a common detriment that mitigates against their proliferation into other applications, such as, for example, a trunked two-way communication system. This detriment consists chiefly of designed-in inflexibility and inefficiency in the communication protocol. Typically, paging systems operate using time division multiplex (TDM) principles wherein a communication channel is divided into repetitive frames having multiple slots. One slot comprises a control/sync slot that each pager must receive to determine if one or more subsequent slots contain a message to be received. Thus, a pager not receiving a message in any particular frame need only be active to receive the control/sync slot, and may "sleep" for the remaining duration of the frame.

While facially sound, the battery saving practices of the paging receiver art are inflexible in that the communication protocol need be preconceived and fixed prior to providing communication services. Once established, protocol designers typically resists modifications or improvements despite technological advances, system loading, or other changed conditions. Moreover, conventional paging battery saving techniques are inefficient in that each pager must receive the control/sync slot whether or not it will receive a message in that frame. The process of receiving the control/sync slot inefficient in and of itself for each frame that a message is not received. Accordingly, extending these techniques into other applications would only continue the proliferation of inflexible communication systems.

In contrast to paging systems, two-way trunked communication systems operate to allocate several communication channels among a plurality of subscriber units. When not participating in a call, each subscriber unit monitors a control channel to receive signalling and control information that permits the subscriber units to communicate either individually or in groups (commonly denoted "talk-groups"). The signalling and control information transmitted over the control channel is repeated from time to time to insure that each subscriber unit will receive the required channel information. In this way, a subscriber unit returning to the control channel from a first call may receive the information required to join another call already in progress. Accordingly, a need exists for an energy saving protocol suitable for use in two-way communication systems.

SUMMARY OF THE INVENTION

Accordingly, it is an object of the present invention to provide an energy saving protocol that overcomes the detriments of the prior art.

Briefly, according to the invention, a centralized communication system controller measures and stores a historical record of each subscriber unit's communication activity. By examining this historical record, the controller predicts the subscriber unit's communication activity over a future time interval. A code based upon this prediction is transmitted to the subscriber unit, which causes the subscriber unit to enter an energy saving mode and deactivate non-essential circuits for a time period represented by the code. In this way, the duration of the "sleep" interval may be optimally varied based upon the subscriber unit's communication history.

In another aspect of the invention, unexpected messages for a subscriber unit in the energy saving (sleep) mode are stored electronically until the conclusion of the "sleep" interval. This message storing function enhances system efficiency when the subscriber unit's communication history does not correlate with actual communication traffic.

DETAILED DESCRIPTION OF THE PREFERRED EMBODIMENT

Figure 1:
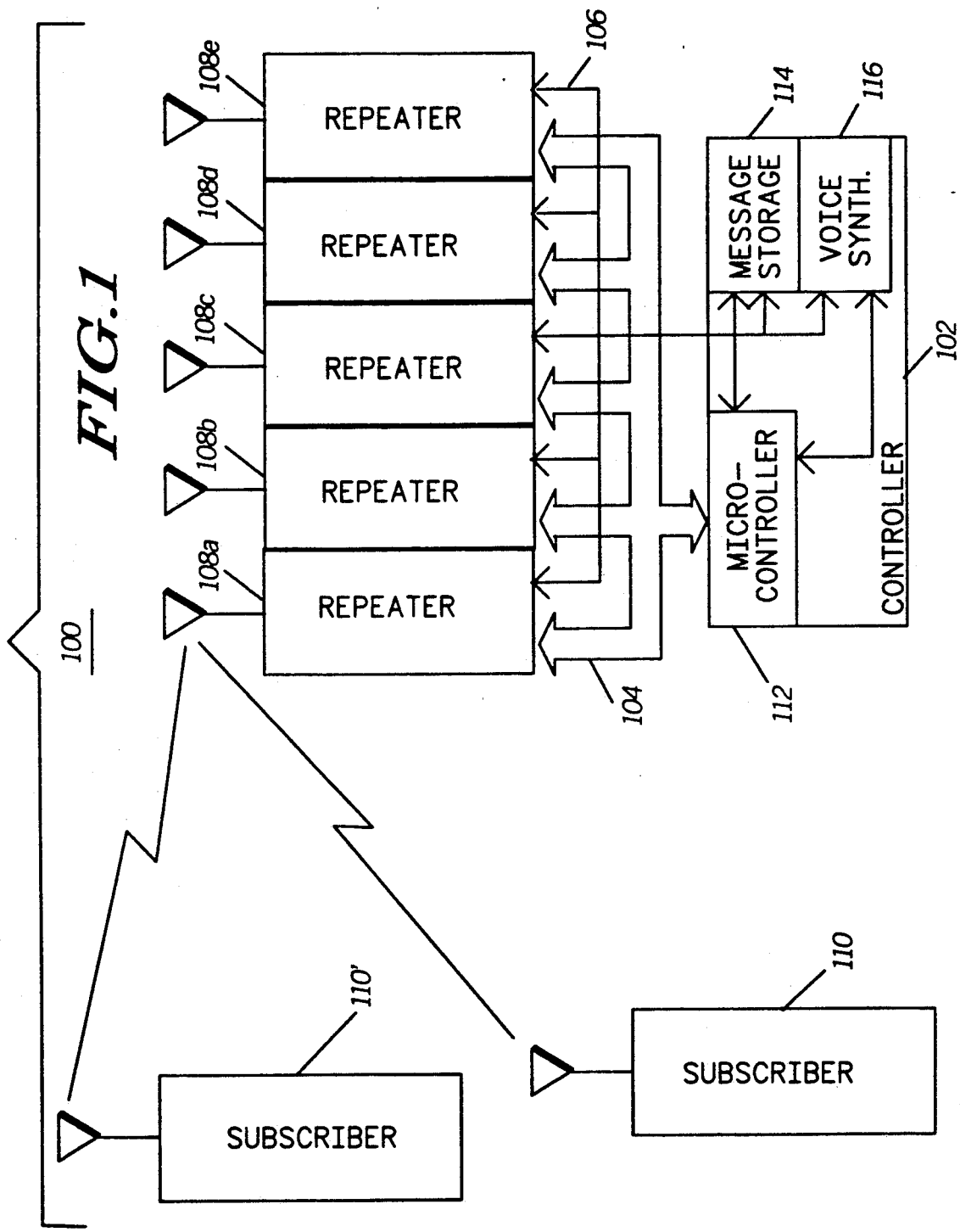
FIG. 1 is a block diagram of a two-way trunked communication system according to the present invention.

Referring to FIG. 1, a block diagram of a two way trunked communication system 100 according to the present invention is shown. The fixed equipment of the trunked communication system 100 consists of a controller 102, which is coupled via a data/control bus 104 and an audio bus 106 to a plurality of repeaters 108a–108e. A radio frequency communication channel associated with each repeater is shared among a plurality of subscriber units (two shown) to provide voice and data communication between individual subscriber units or groups of subscribers. Typically, one of the repeaters is selected to be a control station, which receives channel requests and transmits channel grants from and to the subscriber units. Optionally, the control and signalling information may be transmitted subaudibly over one or more of the repeaters 108a–108e. In this way, a repeater need not be dedicated to performing the control and signalling function.

According to the invention, the controller 102 comprises a microcontroller 112, which preferably is embodied as an MC68020 microcontroller manufactured by Motorola, Inc., or its functional equivalent. The microcontroller 112 controls the various repeaters 108a-108e via the data bus 104, and also receives channel requests and transmits channel grants from and to the subscriber units via the data bus 104 and the repeaters 108a-108e.

The microcontroller 112, together with any required memory components, measures and maintains a historical record of the communication activity of each subscriber unit and each talk-group of subscriber units. In the preferred embodiment of the present invention, this historical record comprises a chronological time-of-day record of a unit's or group's communication traffic, which is maintained for the preceding business day's communication activities.

According to communication traffic studies, each subscriber unit will make one call per hour, and each dispatch type call typically lasts for approximately twenty eight seconds. By examining the communication traffic over a selected time interval (preferrably examined in fifteen minutes sections), the microcontroller 112 predicts the likelihood that a subscriber (or group) will make or receive a call over a future time interval. That is, if the historical record for a time interval correlates highly over the historical data base, then the model of the communication activity provided by the historical data base should accurately predict the communication traffic over a future time interval. Using these predictions, the central 102 transmits a code (via a repeater) to one or more subscriber units instructing them to enter an energy saving mode, wherein non-essential circuits and subsystems are deactivated for a time interval based upon the received code, which in turn, is based upon a predicted period of non-activity. Of course, depending upon the transmission habits of the various subscribers, the predicted period of non-activity may be a short or a long interval. Accordingly, the time each subscriber (or group) is instructed to enter the energy saving mode will vary in accordance with these predictions, and at each interval, subscriber units may be instructed to enter the energy saving mode at varying times.

Since a subscriber (or group) operating in the energy saving mode cannot receive a transmission from other subscriber unit, the present invention contemplates storing (voice or data) messages from other subscribers that do not meet the communication activity model. Accordingly, each repeater 108a-108e is coupled (via the audio bus 106) to a voice storage unit 114. A message received for a "sleeping" subscriber unit will be stored in the message storage unit until the energy saving mode has been terminated. Since the central knows when the subscriber unit will "awake" from the energy saving mode, the microcontroller 112 commands the voice synthesizer 116 to transmit a stored voice message to the subscriber unit at the earliest possible moment. Of course, data messages may be transmitted without converting them into voice information. In this way, the energy saving sleep interval comprises a function of each subscriber's communication habits, with message storage contemplated for those messages that do not conform with the communication traffic model.

Once a subscriber unit (or group) exits (awakes) from the energy saving mode, the control/signalling information transmitted from the central 102 is monitored to determine if a stored message will be forwarded for reception. If no message is forthcoming, the subscriber unit (or group) automatically re-enters the energy saving mode for the time duration last received. This process of exiting and re-entering the energy saving mode continues for a fifteen minute interval, which represents the preferred time interval for the central to re-examine and predict communication activity for the next fifteen minute period. Thus, at each fifteen minute interval, the central 102 examines the stored communication history to predict the communication activity for the next fifteen minute period. In this way, the central is not overburdened since subscriber units will exit and re-enter the energy saving mode automatically for fifteen minutes, giving the central ample time to process other information and control the communication system's activities.

In some cases, a subscriber will not have a regular and habitual communication traffic pattern. In these cases, examination of the historical data base may provide uncertain information in that the historical communication data will not sufficiently correlate to enable a prediction to be made with high accuracy. Accordingly, the subscriber unit may not be ordered to enter an energy saving mode (or instructed to enter the energy saving mode for a very short time interval). Of course, a subscriber unit in the energy saving mode is automatically activated if its operator activates the transmitter circuits of the subscriber unit.

Figure 2:
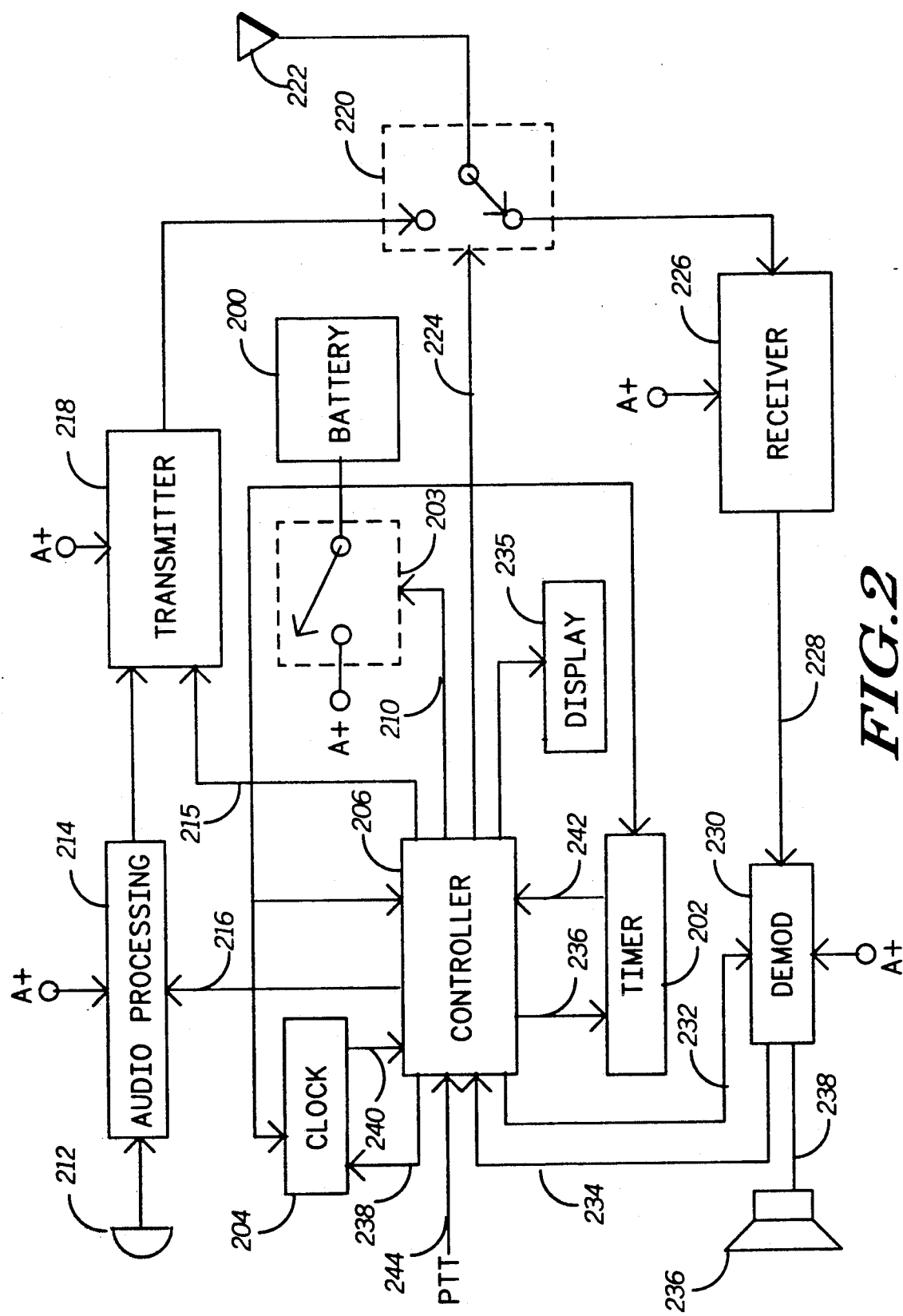
FIG. 2 is a block diagram of a subscriber unit in accordance with the present invention.

Referring to FIG. 2, a subscriber unit 110 is shown in block diagram form. The subscriber unit 110 is powered by a battery 200, which is directly coupled to a timer 202, a clock generator 204 and a microcontroller 206. The microcontroller 206 comprises the heart of the subscriber unit 110, controlling the various circuits and sections to transmit and receive information via the trunked communication system 100. Those circuits not directly coupled to the battery 200 receive power via a switch 208, which is controlled (210) so that these sections may be temporarily deactivated by removing power.

When transmitting, audio information impressed upon a microphone 212 is received by an audio processing unit 214, which may be of conventional design. Responsive to the activation of the PTT signal 244, the microcontroller 206 activates (216) the audio processing unit, which supplies the processed audio information to a transmitter 218. The transmitter 218 is selectively coupled (via an antenna switch 220) to an antenna 222 to radiate information as is known in the art. Data information may also be transmitted when provided by the microcontroller 206 to the transmitter 218 via a data line 215.

To receive information, the antenna switch 220 is controlled (224) by the microcontroller 206 to couple the antenna 222 to a receiver 226. A recovered baseband signal 228 is processed by a demodulator 230 when activated 232 by the microcontroller 206. Voice (audio) information 238 is routed from the demodulator 230 to a speaker 236 for presentation of the information to the subscriber. Data (such energy saving codes sent from the central 102) recovered by the demodulator 230 is provided directly (via received data line 234) to the microcontroller 206 for processing. Data messages may also be processed and presented to an operator via a display 235.

To enter the energy saving mode, the microntroller 206 program (via line 236) a timer 202 for a time interval related to a code received from the central 102. As previously mentioned, this code is based upon the central's prediction of a future time interval during which there is low probability of the subscriber unit transmitting or receiving a message. Preferably, a portion of the code contains information that may be decoded to determine the time interval that the subscriber unit is to remain in the energy saving mode. Alternately, the code may identify a particular one of several time intervals stored within the microcontroller 206 or in "off-chip" memory. In any event, the microcontroller temporarily suspends power from non-essential circuits by opening (210) the power switch 208. Lastly, the microcontroller also commands (238) the clock source 204 to provide a reduced rate clock signal 240, to further conserve energy.

At the conclusion of the "sleep" interval, the timer 202 (which is directly coupled to the battery 200 and receives continuous power) asserts a signal 242, which triggers the microcontroller to "awake" (return) from the energy saving (sleep) mode. This is accomplished by the microcontroller by closing (210) the switch 208 and instructing (238) the clock source 204 to provide the clock signal 240 at its typical operating rate. Once recovered from the energy saving mode, the subscriber unit 110 operates to receive any messages stored by the central 102. If no messages are forthcoming, the subscriber unit (or group) operates to automatically re-enter the energy saving mode for the time period last received. The subscriber unit continues to exit (and look for stored messages) and re-enter the energy saving mode for a fifteen minute interval. According to the invention, a new energy saving time interval (which may be longer, shorter, the same as the last interval, or a command not to energy save) is sent from the central each fifteen minutes, which represent a prediction of the subscriber unit's (or group's) communication activity for the next fifteen minutes.

During the "sleep" interval, however, the subscriber unit may have roamed out of communication range with the central station. As is known, an out of range situation may be detected by determining whether any information is being received on the control/signalling channel. Moreover, even if some information may be received, if the data error rate is sufficiently high, intelligible communication is not possible in a practical sense. Should a subscriber unit determine that it has roamed out of range, the subscriber unit re-enters the energy saving mode for either the last received time interval or a fixed time interval (that may be longer or shorter that the last received time interval) stored within the subscriber unit. This procedure continues until the subscriber has re-established contact with the central and received a new energy saving time interval at the central's normal fifteen minute transmissions.

Alternately, the microcontroller may enter the energy saving mode after determining that communication with the central station is not possible due to a functional error detected by diagnostic routines executed at regular intervals by the microcontroller 206. In this way, battery power is not wasted powering circuits that cannot communicate due to the faulty operation of other circuits. Preferably, once a fault is detected, the subscriber unit continues to enter and exit the energy saving mode in the event that the fault causing the error is temporary, or that proper operation may be restored through some corrective action taken by the subscriber (e.g., changing channels, priority levels, etc.).

In certain circumstances, the subscriber may desire to transmit during a time when the subscriber unit is operating in the energy saving mode. This is particularly likely since the energy saving operation of the subscriber unit 110 is transparent to the subscriber. According to the invention, should the microcontroller 206 detected the PTT signal 244 while operating in the energy saving mode, the subscriber unit 110 quick exits this mode as discussed above. In this way, the present invention provides an energy saving mode that provides both for messages transmitted and received during the "sleep" interval.

Figure 3:
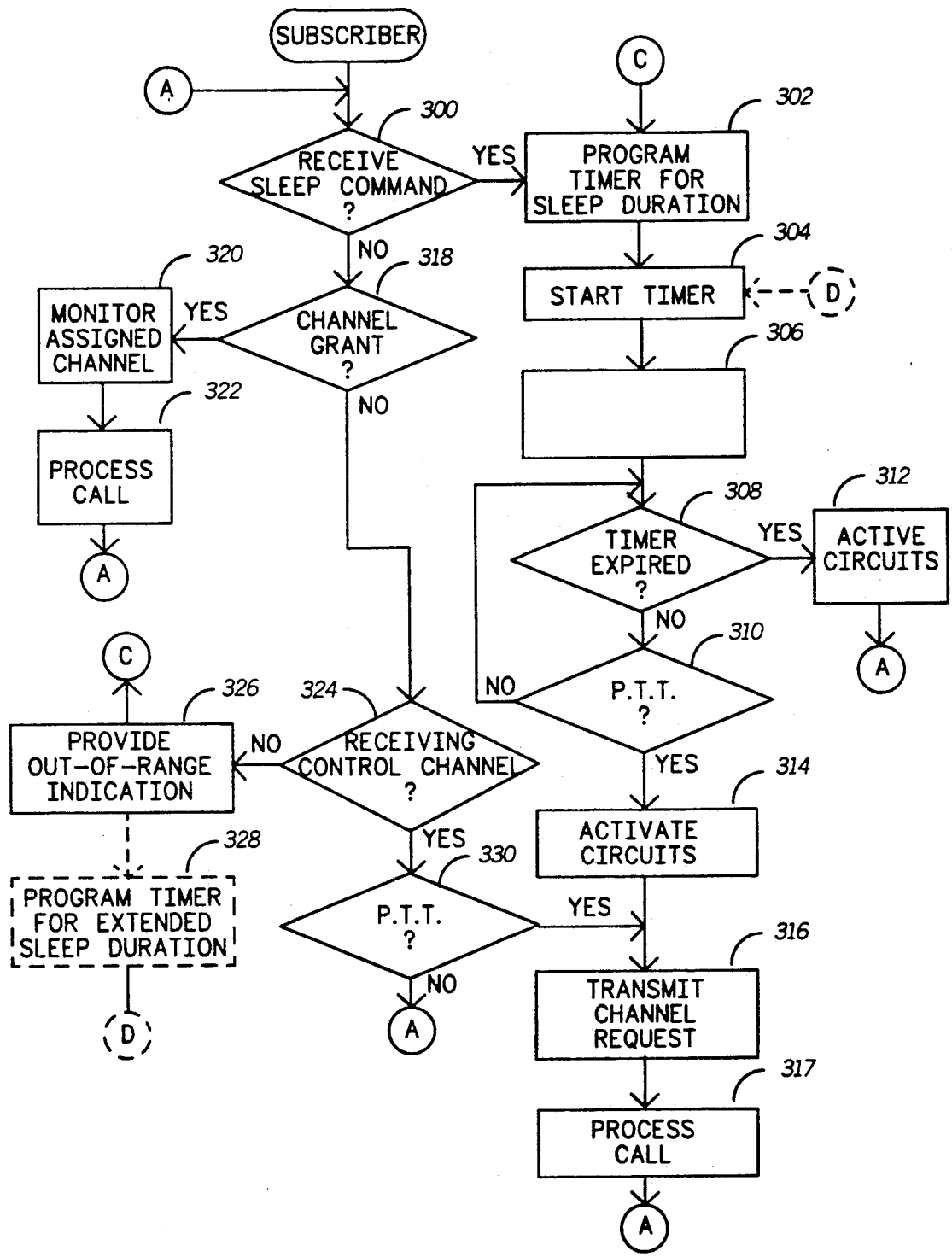
FIG. 3 is a flow diagram illustrating the steps executed by the subscriber unit of FIG. 2 in accordance with the present invention.

Referring to FIG. 3, the subscriber unit's 110 operation begins in decision 300, which determines whether the subscriber unit has received a command to enter the energy saving (sleep) mode. If so, the routine proceeds to step 302 where a timer (202) is programmed (236) for the time interval that the subscriber (110) will operate in the energy saving mode. The timer is started in step 304, after which the non-essential circuits are inactivated in step 306. After deactivation of the non-essential circuits, the routine proceeds to decision 308, which determines whether the timer has expired. If not, the routine proceeds to decision 310, which determines whether the PTT switch has been activated. A negative determination of decision 310 results in a operational loop being formed between decisions 308 and decisions 310. The loop is exited when the timer expires or when the push-to-talk switch is activated. Assuming that the timer has expired, the non-essential routine proceeds from decision 308 to step 312, where the non-essential circuits are reactivated so that the subscriber unit becomes fully operational. After reactivation, the routine proceeds to reference letter A.

Alternately, the loop may be exited if decision 310 determines that the PTT switch has been activated. Such a determination cause the routine to proceed to step 314, which reactivates the "sleeping" non-essential circuits. The now fully operational subscriber unit transmits a channel request (step 316) after which the call is processed normally (step 317).

Assuming that decision 300 determines that a sleep mode command was not received, the routine proceeds to decision 318, which determines whether a channel grant code was received from the central station. If so, the subscriber unit operates to monitor an assigned channel (step 320). The subscriber unit will remain on this channel to process the call (step 322) to its conclusion, after which the routine will return control to reference letter A. If a channel grant was not received, decision 318 routes program flow to decision 324, which determines whether the subscriber unit is receiving the control channel. If the subscriber unit is not receiving control/signaling information (and the unit has not found an operational fault via the diagnostic routines), the subscriber unit assumes that it has roamed out-of-range of the central station, and an out-of-range indication is presented to the operator in step 326. The out-of-range indication may comprise an audible tone, an visible indicator, or other suitable means to inform the operator that communication is impossible due to its operational distance from the central station.

Since the subscriber unit has determined that it is out of communication range, the present invention contemplates the subscriber unit entering the energy saving mode until such time as the subscriber has re-entered communication range. Accordingly to the preferred embodiment, the routine proceeds from step 326 to reference letter C (step 302), where the timer is programmed for the last received sleep interval. After programming, the timer is started (step 304) and the energy saving steps are executed as previously described. Alternately, the subscriber unit may proceed to optional step 328, where the timer is programmed for an extended sleep duration to allow the subscriber sufficient time to come back within communication range. If optional step 328 is executed, the routine proceeds to reference letter D (step 304), which starts the timer and enters the energy saving mode for the time interval specified by step 328.

Assuming that the subscriber unit is receiving the control channel, the routine proceeds to decision 330, which determines whether the PTT switch has been activated. If so, the routine proceeds to step 316, where a channel request is transmitted to the central station. After transmitting the request, the subscriber unit operates to process the call (step 317) following normal procedures after which the routine proceeds to reference letter A.

Figure 4A:
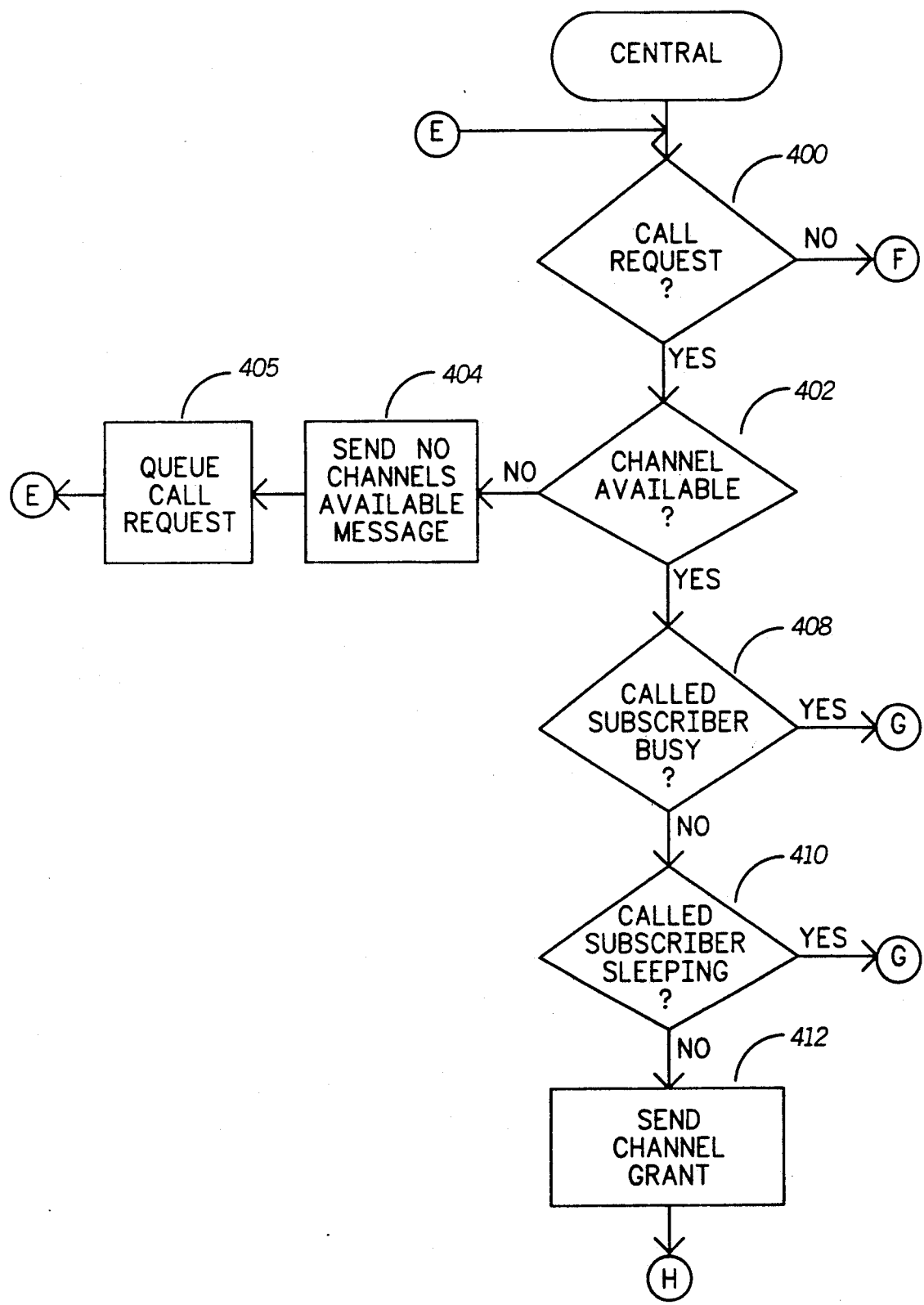
FIGS. 4a–4d are flow diagrams illustrating the operation of the central controller of FIG. 1 in accordance with the present invention.

Referring to FIG. 4a, the central station begins its operational routine in decision 400, which determines whether a call request was received from a subscriber unit. If not, the routine proceeds to reference letter F of FIG. 4b. However, if a call request was received, the routine proceeds to decision 402, which determines whether a communication channel is available to assign to the requesting subscribing unit. If not, a "no channels available" message is transmitted to the subscriber (step 404) and the call request is placed in a queue (step 406) to await an available channel. Following this, the routine returns to reference letter E. Assuming that a channel is available for communication, the routine proceeds to step 408, which determines whether the subscriber unit to be called is currently engaged in another conversation (i.e. BUSY). If so, the routine proceeds to reference G of FIG. 4c. However, if the subscriber unit is not busy, the routine next determines whether the subscriber is operating in the energy saving mode, and therefore, will not be responsive to a command to communicate if so, the routine proceeds to reference letter G of FIG. 4c. Conversely, if the subscriber is not sleeping and is available to receive the call, the routine proceeds to step 412, where channel grant is transmitted to the subscriber units so that the call may commence. After sending the channel grant, the routine proceeds to reference letter H of FIG. 4d.

Figure 4B:
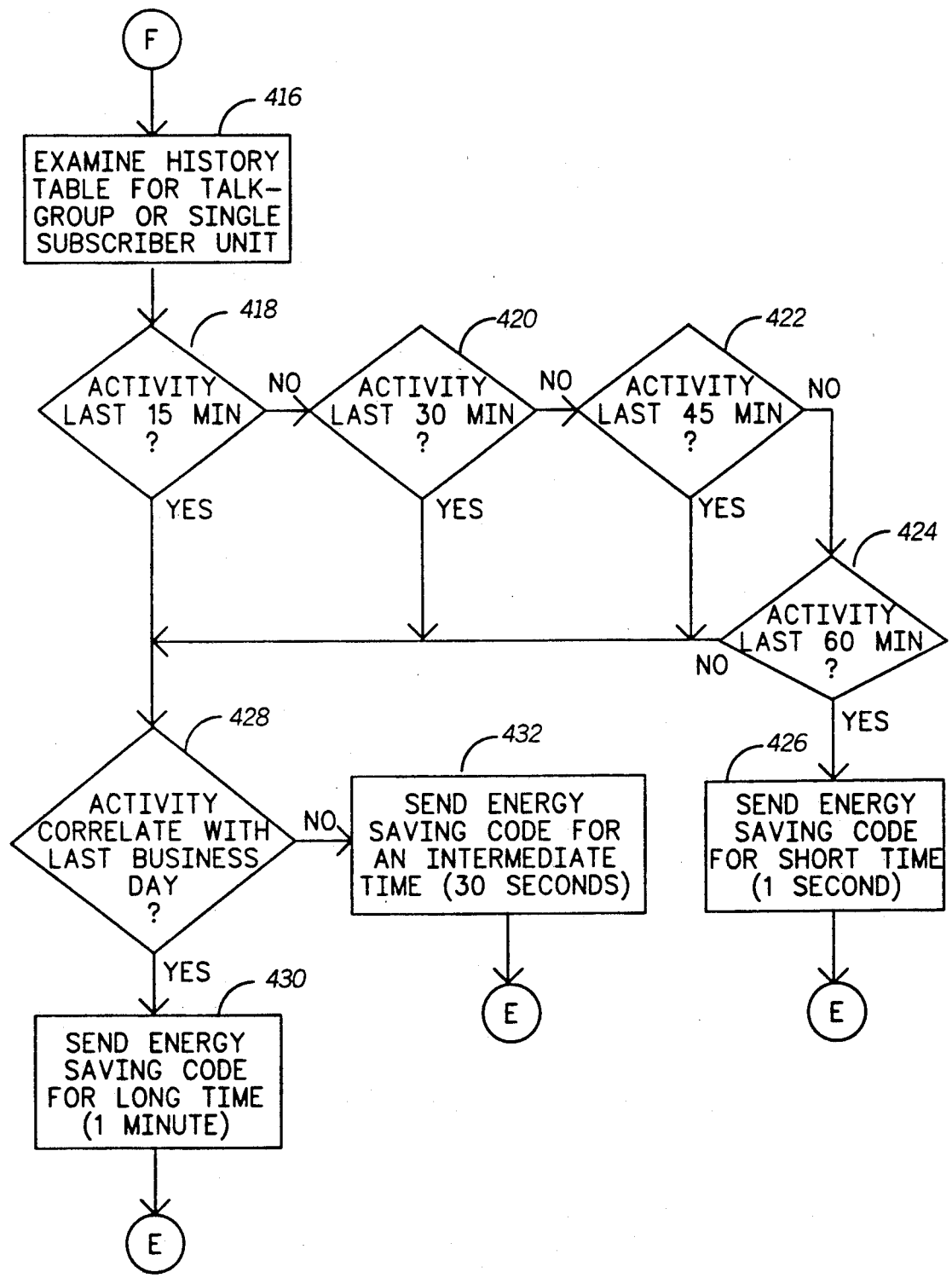

Referring to FIG. 4b, the routine continues in step 416, where the communication history table is examined for either a single subscriber unit or a selected talkgroup. According to the preferred embodiment of the invention, the history table is examined in fifteen minute intervals. Thus, decision 418 determines whether the subscriber (or group) transmitted or received a call in the last fifteen minutes. If not, decision 420 determines whether there has been any communication activity in the last thirty minutes by examining another fifteen minute interval. If no communication activity is found in decision 420, the routine turns to decision 422 to determine whether there has been any communication activity in the last forty-five minutes. If still no communication activity is discovered, the routine proceeds to decision 424, which determines whether the subscriber unit has transmitted or received a call in the past hour. If so, the subscriber unit (or group) may be expected (predicted) to communicate within the next fifteen minutes. According, the routine proceeds to step 426, which commands the subscriber unit (or group) to enter the energy saving mode for a short time interval (preferrably one second). Upon receiving this command, the subscriber unit (or group) operates to automatically enter, exit (and check for stored messages), and reenter the energy saving mode for the next fifteen minutes; each energy saving period lasting one second.

An affirmative determination of either decisions 418, 420, or 422 (or a negative determination of decision 424) routes control to decision 428, where the just determined past communication activity is correlated (compared) to the same time interval for the previous business day. That is, the present invention compares Monday's communication activity with the previous Friday's communication activity, if the subscriber unit normally has Saturday and Sunday as non-business days. In this way, a day having negligible communication activity is not compared to a normal business day's communication activity. Moreover, the present invention compares the same time periods of the two business days. For example, if on a Wednesday decision 422 determines at 11:15 am that there has been a communication within the last forty-five minutes (compared fifteen minutes at a time), that subscriber's (or group's) communication activity for Tuesday between 10:30 am and 11:15 am is compared to determine their correlation. If decision 428 finds a correlation factor above a predetermined threshold, there is only a very small probability that communication will take place in the next fifteen minutes. Accordingly, the central commands the subscriber unit (or group) to enter the energy saving mode for a long (preferrably one minute) time interval. Alternately, if the correlation is not sufficiently high, there exists a somewhat higher likelihood that communication will take place in the next fifteen minutes. In these cases, the routine proceeds to step 432, where the central sends an energy saving interval of an intermediate duration (preferrably thirty seconds).

Figures 4C, 4D:
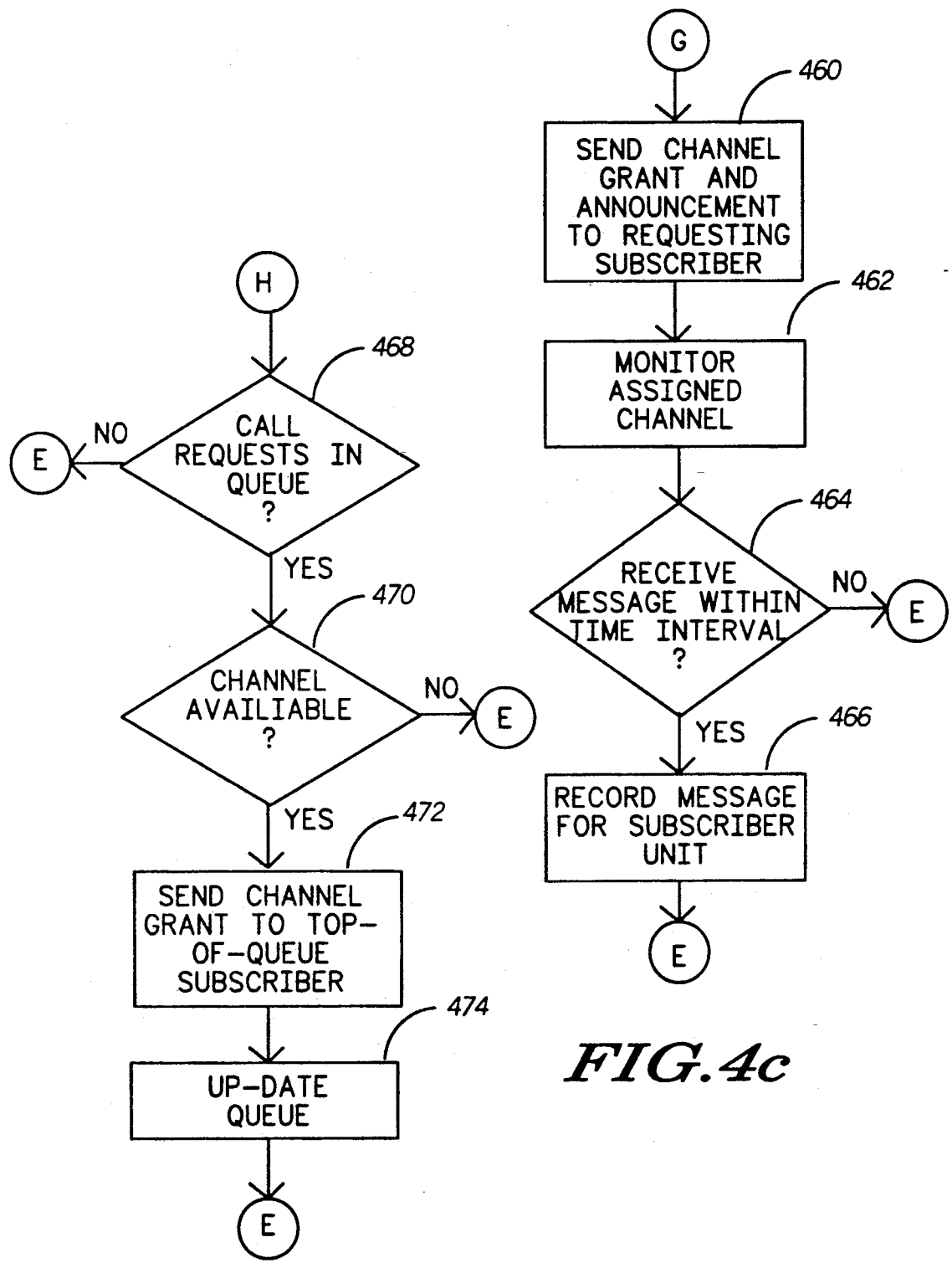

Referring to FIG. 4c, the portion of the central routine executed when the subscriber is busy begins with step 460, where a channel grant is transmitted to the requesting subscriber along with an appropriate announcement message (i.e., the called subscriber is busy or sleeping) indicating that a message for the called party will be stored by the central station if desired by the requesting subscriber. To receive this message, the central station monitors the assigned channel (step 462), and determines whether a message has been received within a time interval from the requesting subscriber (decision 464). If no message is received, the routine proceeds to reference letter E of FIG. 4a. Conversely, if a message is received from the requesting subscriber unit, the central (102) stores the message (114) for later forwarding to the busy subscriber. Following this, the routine proceeds to reference letter E of FIG. 4a.

Referring to FIG. 4d, the portion of the central routine executed following a channel grant begins in decision 468, which determines whether call requests are waiting in the queue. If so, the routine proceeds to decision 470, which determines whether a channel is available. If not, the routine proceeds to reference letter E of FIG. 4a. However, if channels are available, a channel grant is transmitted to the subscriber at the top of the queue (step 472). After this, the queue is updated (step 474) so that the next subscriber is placed at the top of the queue and will receive the next available channel. Following the queue updating, the routine proceeds to reference letter E of FIG. 4a.

What is claimed is:

1. In a communication system having at least one central station for allocating communication channels among a plurality of subscriber units, a method for temporarily deactivating at least one of the plurality of subscriber units from the central station comprising the steps of:
   (a) determining which of the plurality of subscriber units should be temporarily deactivated to provide a deactivation subset of one or more subscriber units;
   (b) examining past communication activity of one or more subscriber units;
   (c) determining a time interval during which said deactivation subset should be deactivated, said determination being based on:
      (b1) examining past communication traffic activity of one or more of the subscriber units during a past period of time, said traffic activity including the amount of messages transmitted by or to each of the one or more subscriber units over a predetermined period of time;
      (b2) determining said time interval during which said deactivation subset should be deactivated; and,
   (d) transmitting a code representing said time interval to said deactivation subset.

2. The method of claim 1, which includes the step of:
   (e) updating a list of temporarily deactivated subscriber units.

3. The method of claim 1, which includes the steps of:
   (e) determining whether a signal representing a call request code has been received from a subscriber
   (f) unit contained within said deactivation subset; and, transmitting a signal representing a channel grant code to said subscriber unit.

4. The method of claim 1, which includes the steps of:
   (e) determining when said time interval has expired; and,
   (f) updating a list of temporarily deactivated subscriber units.

5. The method of claim 1, wherein step (a) comprises the step of selecting one of said plurality of subscriber units to provide said deactivation subset.

6. The method of claim 1, wherein step (a) comprises the step of selecting at least one of said deactivation subset.

7. The method of claim 1, herein step (b1) comprises examining past communication activity in fifteen minute intervals.

8. The method of claim 1, which includes the steps of:
   (e) receiving, from a requesting subscriber, a signal representing a request to communicate with a subscriber unit contained within said deactivation subset; and,
   (f) transmitting a signal representing a store message command to said requesting subscriber.

9. The method of claim 8, which includes the steps of:
   (g) receiving a message from said requesting subscriber; and,
   (h) storing said message in a memory means.

10. The method of claim 1, which includes the subscriber unit steps of:
    (e) receiving a signal representing a command to temporarily deactivate for a time interval;
    (f) deactivating non-essential circuits for said time interval; and,
    (g) reactivating said non-essential circuits at the conclusion of said time interval.

11. The method of claim 10, which includes the step of: (f1) reactivating said non-essential circuits to transmit a signal representing a call request regardless of whether said time interval has expired.

12. The method of claim 10, which includes the step of: (h) receiving a signal from the central station representing a message that was stored during said time interval.

13. In a radio communication system having at least one central station for allocating radio frequency communication channels among a plurality of subscriber units, a method for temporarily deactivating at least one of the plurality of subscriber units, comprising the steps of:
    (a) determining whether the at least one subscriber unit is non-functional due to a defect or operational fault;
    (b) deactivating non-essential circuits at the at least one subscriber unit for a time interval in response to a determination that the at least one subscriber is non-functional;
    (c) reactivating the non-essential circuits by the at least one subscriber unit periodically in order to determine if the fault condition is no longer present at the at least one subscriber unit; and,
    (d) monitoring the radio communication system if the fault condition is found to be no longer present in step (c) in order to determine if a message has been sent by the at least one central station.

14. In a radio communication system having at least one central station for allocating radio frequency communication channels among a plurality of subscriber units, a subscriber unit comprising:
    means for determining whether the subscriber unit is non-functional due to a defect or operational fault;
    means for deactivating non-essential circuits in the subscriber unit for a time interval in response to a determination that the subscriber is non-functional;
    means for reactivating the non-essential circuits periodically in order to determine if the fault condition is no longer present at the subscriber unit; and
    means for monitoring the radio communication system if the fault condition is found to be no longer present in order to determine if a message has been sent by the at least one central station.

15. A communication system having at least one central station for allocating communication channels among a plurality of subscriber units which can receive and transmit messages, the system capable of temporarily deactivating at least one of the plurality of subscriber units from the central station, comprising:
    means for examining past communication traffic activity of one or more subscriber units, the past communication traffic activity being determined by the amount of messages that have been received or transmitted by the one or more subscriber units as measured by the at least one central station;
    means for determining which of the plurality of subscriber units should be temporarily deactivated to provide a deactivation subset of one or more subscriber units, the deactivation determination being based on the past communication traffic activity of the one or more subscriber units;
    means for determining a time interval during which said deactivation subset should be deactivated; and,
    means for transmitting a code representing said time interval to said deactivation subset.

* * * * *